(12) United States Patent
Kim et al.

(10) Patent No.: US 11,978,920 B2
(45) Date of Patent: May 7, 2024

(54) INLET DUCT FOR VEHICLE BATTERY SYSTEM

(71) Applicants: HYUNDAI MOTOR COMPANY, Seoul (KR); KIA CORPORATION, Seoul (KR)

(72) Inventors: Byung Su Kim, Incheon (KR); Jun Seok Choi, Hwaseong-si (KR); Jin Won Kim, Pyeongtaek-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/873,355

(22) Filed: Jul. 26, 2022

(65) Prior Publication Data

US 2022/0359948 A1 Nov. 10, 2022

Related U.S. Application Data

(63) Continuation of application No. 16/876,993, filed on May 18, 2020, now Pat. No. 11,431,058.

(30) Foreign Application Priority Data

Nov. 14, 2019 (KR) .................. 10-2019-0146148

(51) Int. Cl.
*H01M 50/20* (2021.01)
*H01M 50/249* (2021.01)
*H01M 50/30* (2021.01)
*H01M 50/35* (2021.01)

(52) U.S. Cl.
CPC ......... *H01M 50/394* (2021.01); *H01M 50/20* (2021.01); *H01M 50/249* (2021.01); *H01M 50/35* (2021.01); *H01M 2220/20* (2013.01)

(58) Field of Classification Search
CPC .... H01M 50/394; H01M 50/20; H01M 50/10; H01M 50/391
See application file for complete search history.

(56) References Cited

U.S. PATENT DOCUMENTS

| | | | |
|---|---|---|---|
| 2,565,767 A | 8/1951 | Gaskell, Jr. | |
| 6,828,755 B1* | 12/2004 | Iverson ............... | H01M 10/613 320/104 |
| 2002/0051340 A1* | 5/2002 | Oda .................... | H01M 50/213 903/903 |
| 2010/0116570 A1* | 5/2010 | Sugawara ............ | H01M 50/35 429/82 |
| 2012/0111651 A1 | 5/2012 | Irie et al. | |
| 2012/0129440 A1 | 5/2012 | Kitaguchi et al. | |
| 2014/0023892 A1 | 1/2014 | Lim et al. | |
| 2015/0195960 A1 | 7/2015 | Seki et al. | |

(Continued)

FOREIGN PATENT DOCUMENTS

KR 2014-0012228 A 2/2014

*Primary Examiner* — Kenneth J Douyette
(74) *Attorney, Agent, or Firm* — MCDONNELL BOEHNEN HULBERT & BERGHOFF LLP

(57) ABSTRACT

An inlet duct for a vehicle battery system includes an inlet part having an inlet hole open toward a vehicle interior, outlet parts divided from the inlet part and having outlet holes so as to supply air introduced to the inlet hole to the battery system via two separated paths, and a grill provided in the inlet part by having multiple ribs forming a grid to cover the inlet hole.

16 Claims, 9 Drawing Sheets

(56) References Cited

U.S. PATENT DOCUMENTS

2017/0327058 A1    11/2017  Takezawa et al.
2018/0015839 A1*   1/2018   Ito ........................... B60L 50/64
2018/0337434 A1*  11/2018   Burgers ................... F28F 9/02

* cited by examiner

INLET DUCT FOR VEHICLE BATTERY SYSTEM

CROSS REFERENCE TO RELATED APPLICATIONS

The present application is a continuation of U.S. patent application Ser. No. 16/876,993, filed May 18, 2020, which claims priority to Korean Patent Application No. 10-2019-0146148, filed Nov. 14, 2019. The entire disclosure contents of these applications are herewith incorporated by reference into the present application.

BACKGROUND

Field

The present disclosure generally relates to a duct for a vehicle battery system. More particularly, the present disclosure relates to a structure of an inlet duct, to which air is introduced from a vehicle interior to cool a battery system.

Description of the Related Art

Electric or hybrid vehicles are required to be equipped with a battery system including a high voltage battery. Since the battery system is relatively large in volume and requires watertightness, various attempts have been made to secure a mounting position and space, and in some cases, the battery system may be installed below a second-row seat (a rear seat) of a vehicle.

The battery system described above includes a battery module assembly (BMA) constituting the high voltage battery, a power relay assembly (PRA), a battery management system (BMS), and a cooling device cooling the BMA.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose an inlet duct for a vehicle battery system, wherein although the inlet duct is open toward a vehicle interior such that air of the vehicle interior is introduced to cool the battery system, the inlet duct effectively blocks foreign materials from being introduced to the inside of the battery system and noise leakage toward the vehicle interior from the inside of the battery system to be significantly reduced.

In order to achieve the above object, according to one aspect of the present disclosure, there is provided an inlet duct for a vehicle battery system, the inlet duct including an inlet part having an inlet hole open toward a vehicle interior, outlet parts divided from the inlet part and having outlet holes so as to supply air introduced to the inlet hole to the battery system via two separated paths, and a grill provided in the inlet part by having multiple ribs forming a grid to cover the inlet hole.

The inlet hole of the inlet part may be provided to be open from a lower side of a middle of a rear seat of a vehicle toward a front thereof, and a lower side of each of the outlet parts may be provided to communicate with an upper surface of the battery system.

The two divided outlet parts may be spaced apart from each other to avoid interference with a battery frame fixing the battery system to a vehicle body.

Multiple fixing brackets may be provided to fix the inlet duct to the battery system.

The fixing brackets may include an outlet part fixing bracket fixing an upper side of each of the two outlet parts of the inlet duct to the battery frame, and an inlet part fixing bracket fixing a lower side of the inlet part to the battery frame.

A flange member having a lower surface parallel with an upper surface of the battery system may be combined with an end part of each of the outlet parts such that the outlet part is brought into close contact with a duct hole, which is provided at an upper side of the battery system, from an upper side of the duct hole, and the outlet part and the duct hole are in a sealed state by surface contact therebetween.

A protrusion part may be provided at the duct hole provided at the upper side of the battery system by protruding upward therefrom such that the protrusion part is combined with each of the outlet parts by having sealing while communicating with the outlet part, and an expanded part may be provided at the outlet part, the expanded part being configured to seal an inner side of the protrusion part by surrounding an outer side of the protrusion part.

An end part of a front of the grill may slant along an extension line of a front section of a seat cushion of a rear seat located at the upper side of the battery system.

Each of the ribs forming the grid of the grill may have a cross-sectional shape of a parallel part parallel to a streamline of air flowing through the inlet part and a sloping part inclined to the parallel part connected to each other.

A plurality of partition barriers may be provided in the inlet duct, each of the partition barriers blocking a section of a portion of each flow path of air reaching the outlet hole from the inlet hole.

The partition barriers may have a middle partition barrier provided at a position prior to being divided to the two outlet parts from the inlet part and a side partition barrier provided at each of the outlet parts of portions divided to the two outlet parts from the inlet part.

The side partition barrier may slant to a streamline of air flowing to the outlet part from the inlet part.

The two side partition barriers of the opposite outlet parts may slant in directions of the two side partition barriers gradually getting closer to each other along a flow of air flowing to the outlet parts from the inlet part.

The partition barrier may be provided by a recessed part recessed inward from each of an upper side and a lower side of the inlet duct.

The recessed part, which constitutes the partition barrier, may be recessed along the same direction as each up and down demolding direction of a mold when the inlet duct is formed by a plastic blowing method.

The present disclosure is intended to propose the inlet duct for a vehicle battery system, wherein although the inlet duct is open toward a vehicle interior such that air of the vehicle interior is introduced to cool the battery system, the inlet duct effectively blocks foreign materials from being introduced to the inside of the battery system and noise leakage toward the vehicle interior from the inside of the battery system to be significantly reduced.

In addition, the reduction in the indoor noise leakage as described above is achieved without using a separate sound absorbing material, thereby reducing the material cost of the battery system.

BRIEF DESCRIPTION OF THE FIGURES

The above and other objects, features, and other advantages of the present disclosure will be more clearly understood from the following detailed description when taken in conjunction with the accompanying drawings, in which.

DETAILED DESCRIPTION

Figure 1:
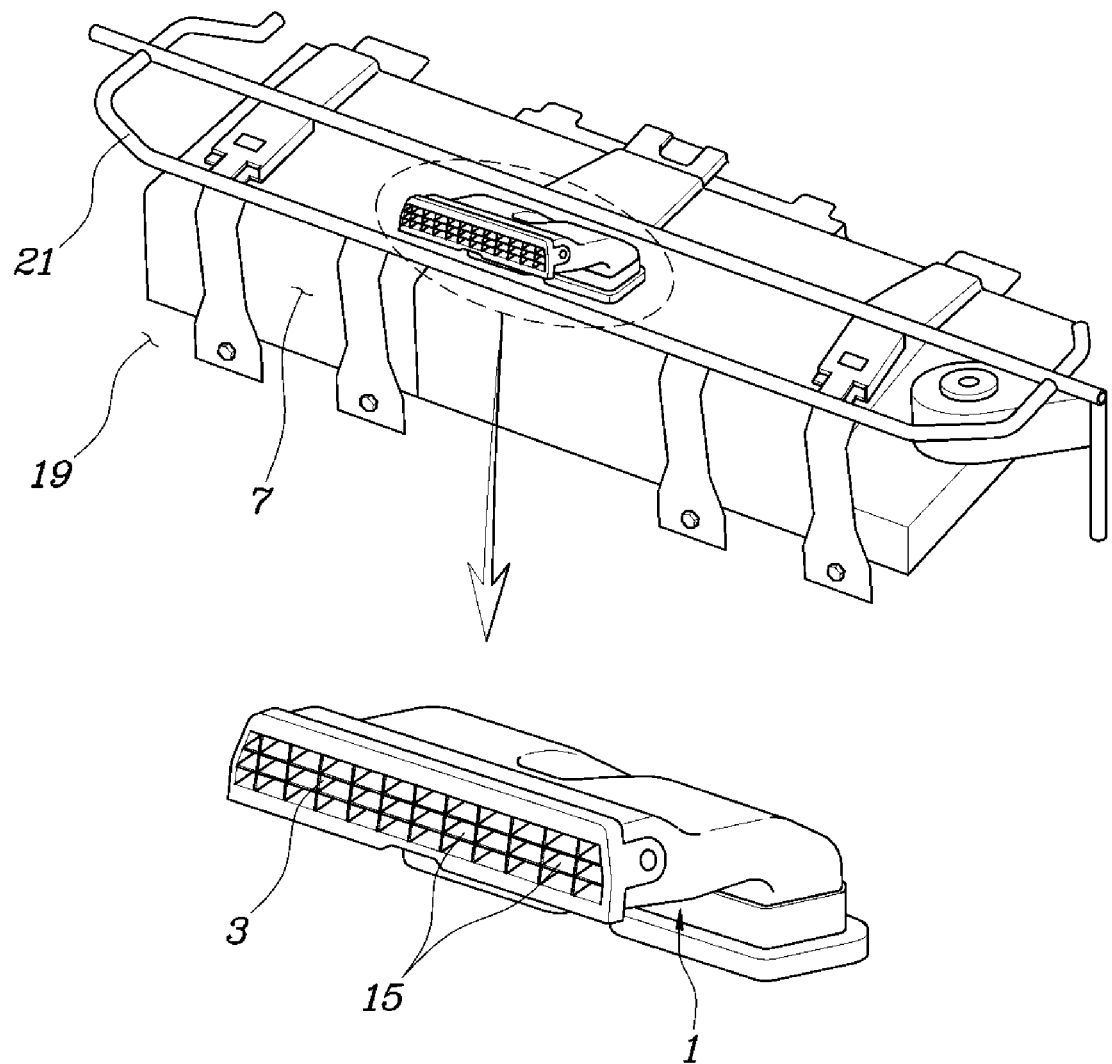
FIG. 1 is a view illustrating an inlet duct for a vehicle battery system according to a first embodiment of the present disclosure.

Referring to FIGS. 1-4, an inlet duct 1 for a vehicle battery system according to a first embodiment of the present disclosure includes an inlet part 5 having an inlet hole 3 open toward a vehicle interior, outlet parts 11 divided from the inlet part 5 and having outlet holes 9 so as to supply air introduced to the inlet hole 3 to the battery system 7 via two separated paths, and a grill 15 provided in the inlet part 5 by having multiple ribs 13 forming a grid to cover the inlet hole 3.

That is, air of a vehicle interior necessary for cooling the battery system 7 is introduced into the inlet part 5 having the inlet hole 3 and is supplied through each of the outlet holes 9 of the outlet part 11 to the inside of the battery system 7. The grill 15 allows the air to be introduced to the inlet part 5, and prevents foreign materials from being introduced to the inside of the inlet part 5 through the inlet hole. Reversely, the grill 15 prevents noise occurring from the battery system 7 from leaking to the vehicle interior.

The inlet hole 3 of the inlet part 5 is provided to be open from a lower side of a middle of a seat cushion 17 of a rear seat of a vehicle toward a front thereof; and a lower side of each of the outlet parts 11 is provided to communicate with an upper surface of the battery system 7.

The two divided outlet parts 11 are spaced apart from each other to avoid interference with a battery frame 21 fixing the battery system 7 to a vehicle body 19.

Figure 2:
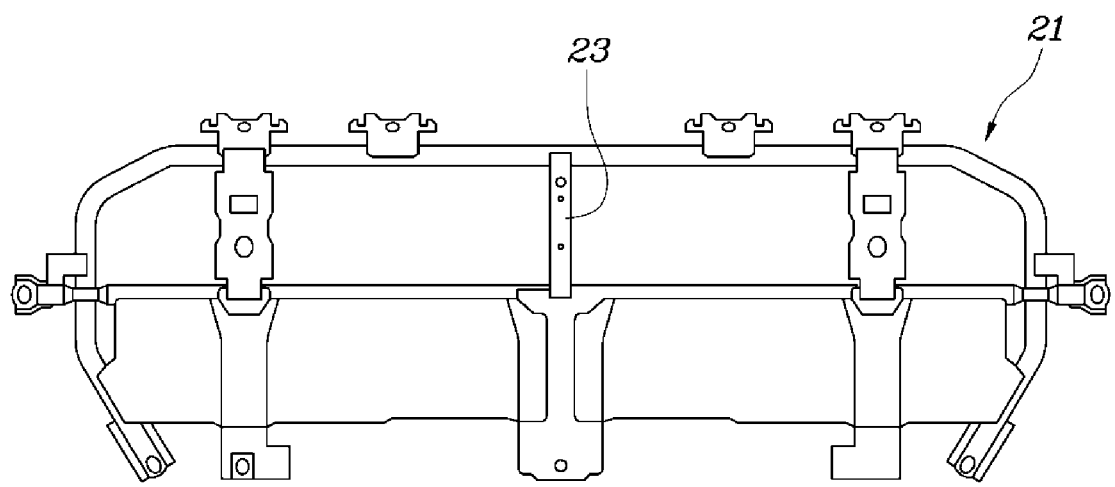
FIG. 2 is a view illustrating a battery frame of FIG. 1.

For reference, the battery frame 21 according to the embodiment of the present disclosure is illustrated in detail in FIG. 2. The inlet duct 1 is installed at an upper side of a connecting member 23 located at an upper side of a middle of the battery frame 21 illustrated in FIG. 2, so a fixed structure illustrated in FIG. 3 can be provided.

That is, multiple fixing brackets are provided to fix the inlet duct 1 to the battery system 7. In the embodiment of the present disclosure, the inlet duct 1 is fixed to the battery frame 21, so the state of the inlet duct 1 fixed to the battery system 7 can be secured.

In the embodiment, the fixing brackets of the present disclosure include an outlet part fixing bracket 25 fixing an upper side of each of the two outlet parts 11 of the inlet duct 1 to the battery frame 21, and an inlet part fixing bracket 27 fixing a lower side of the inlet part 5 to the battery frame 21.

Accordingly, the inlet duct 1 is fixed to the battery frame 21 by the inlet part fixing bracket 27 and the outlet part fixing bracket 25, and the battery system 7 is fixed to the vehicle body 19 by the battery frame 21. As a result, the inlet duct 1 is fixed to the battery system 7.

Figure 3:
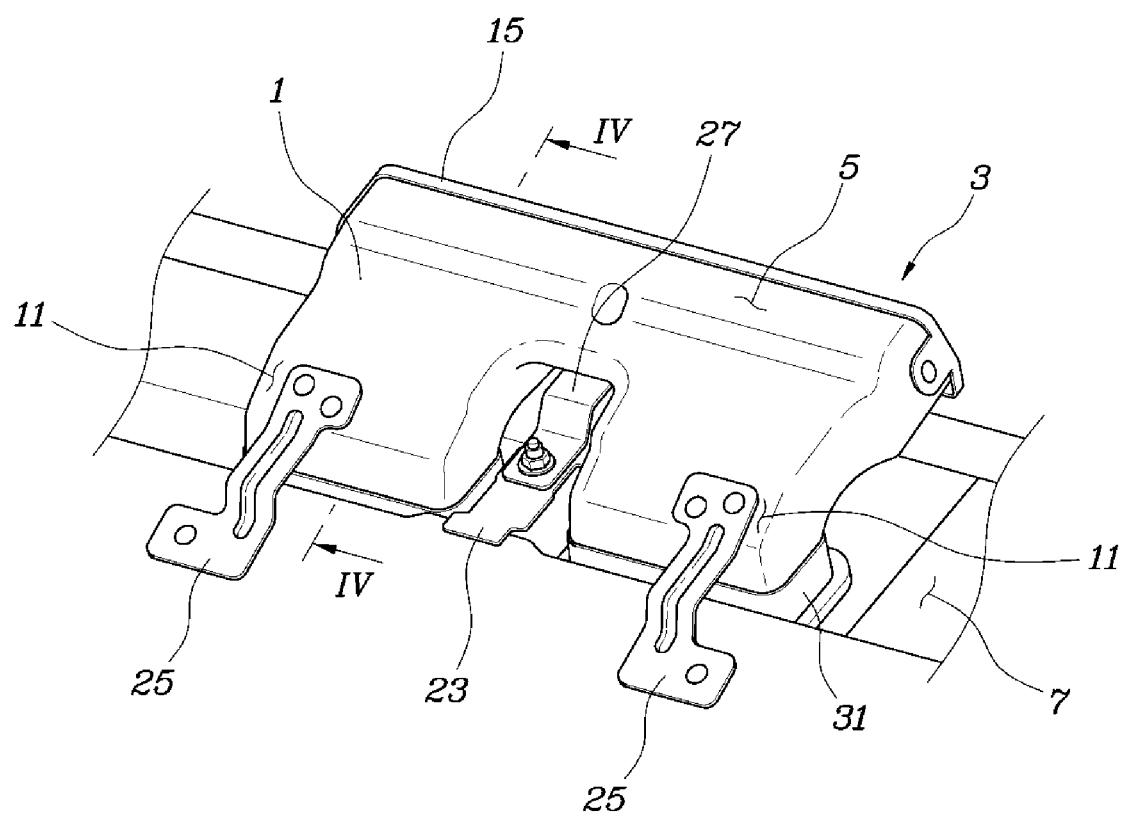
FIG. 3 is a view illustrating the inlet duct of FIG. 1 shown from a different angle.
Figure 4:
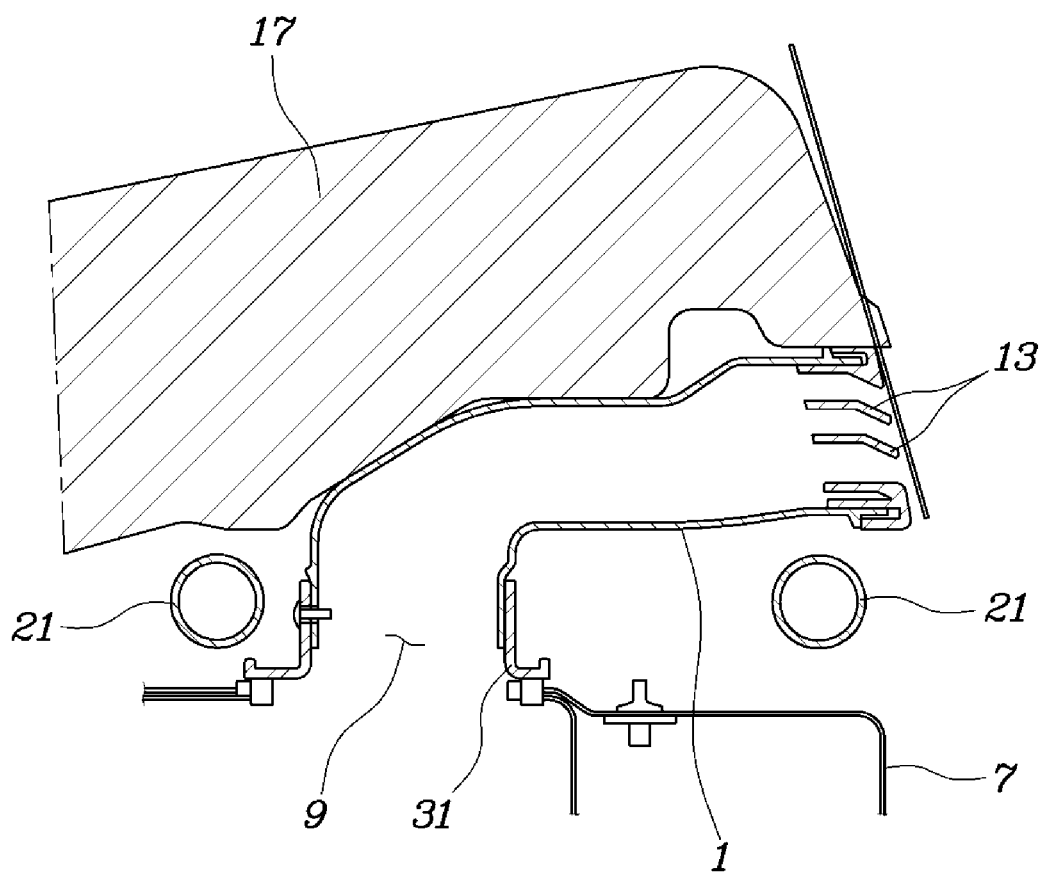
FIG. 4 is a view corresponding to a cross-sectional view taken along line IV-IV of FIG. 3.

Referring to FIGS. 3 and 4, a flange member 31 having a lower surface parallel with an upper surface of the battery system 7 is combined with an end part of each of the outlet parts 11 such that the outlet part 11 is brought into close contact with a duct hole 29, which is provided at an upper side of the battery system 7, from an upper side of the duct hole, and the outlet part 11 and the duct hole 29 are in a sealed state by surface contact therebetween.

Accordingly, the flange member 31 described above is provided at the outlet part 11 of the inlet duct 1 described above. In the configuration in which the inlet duct 1 is fixed to the battery frame 21 by the inlet part fixing bracket 27 and the outlet part fixing bracket 25, the battery frame 21, to which the inlet duct 1 is mounted, is located at the upper side of the battery system 7 to be fixed thereto while the battery system 7 sits on the vehicle body 19. In this state, the flange member 31 is in close contact with the upper surface of the duct hole 29 of the battery system 7 and a sealed state therebetween is obtained by the surface contact, for simple and easy assembly.

As illustrated in FIG. 4, an end part of a front of the grill 15 is slanted along an extension line of a front section of the seat cushion 17 of the rear seat located at the upper side of the battery system 7.

In the above-described structure, the seat cushion 17 and the inlet duct 1 form the same or similar flatness for the aesthetics of a vehicle interior, thereby improving vehicle interior aesthetics.

Figure 5:
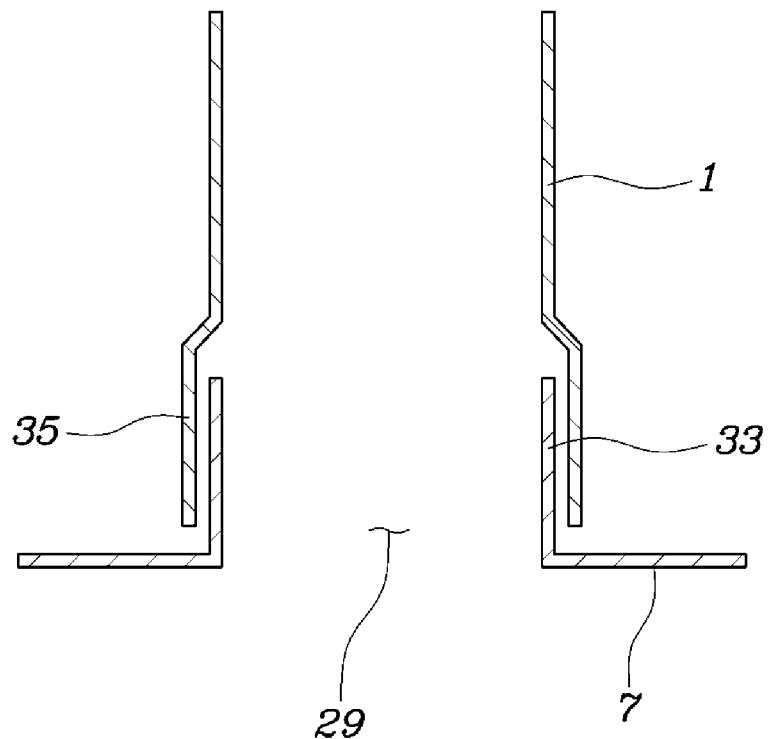
FIG. 5 is a view illustrating a connection structure between the inlet duct and the battery system, which is different from a connection structure of FIG. 4.

Meanwhile, FIG. 5 is a view illustrating a connection structure between the inlet duct and the battery system, which is different from a connection structure of FIG. 4. A protrusion part 33 is provided at the duct hole 29 provided at the upper side of the battery system 7 by protruding upward therefrom such that the protrusion part is combined with the outlet part 11 by having sealing while communicating with the outlet part 11, and an expanded part 35 is provided at the outlet part 11, the expanded part being configured to seal an inner side of the protrusion part 33 by surrounding an outer side of the protrusion part 33.

That is, in this case, the sealed state of a portion of supplying air to the battery system 7 from the inlet duct 1 is secured by fitting the expanded part 35 of the inlet duct 1 over the protrusion part 33 of the upper side of the battery system 7.

Figure 6:
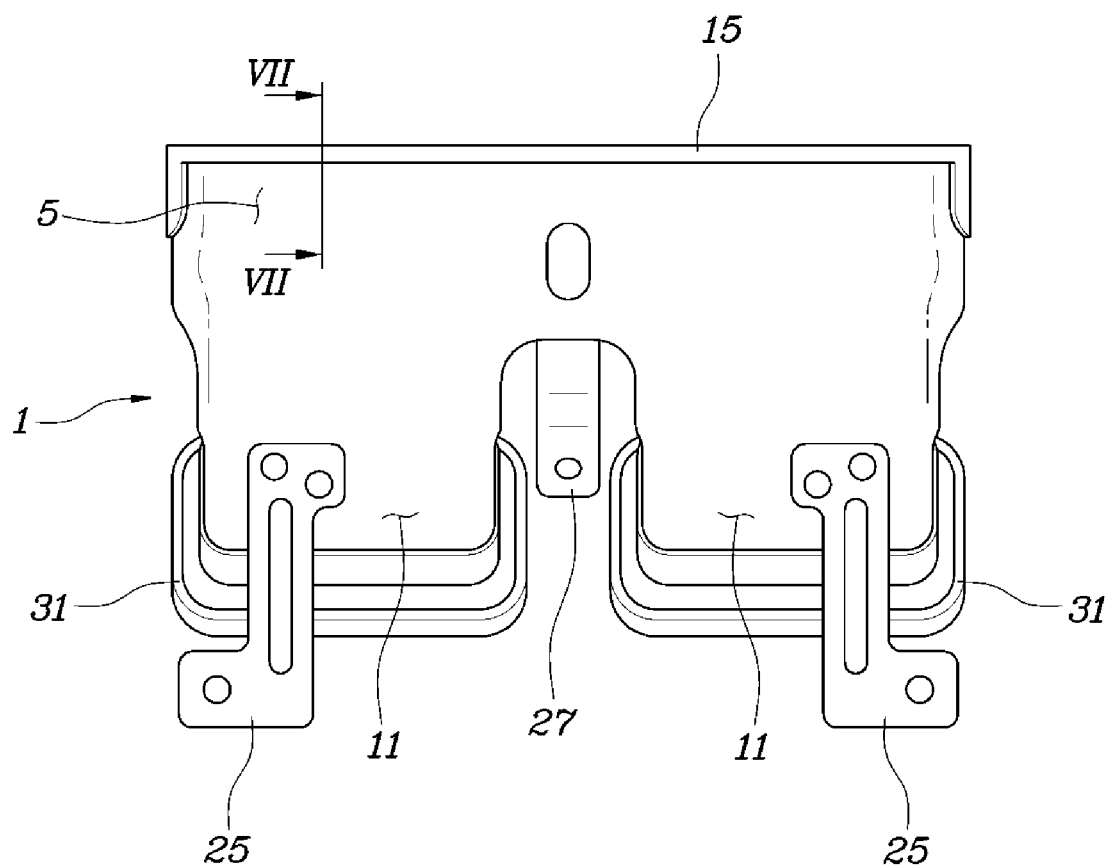
FIG. 6 is a view illustrating the inlet duct of FIG. 1 shown from an upper side.
Figure 7:
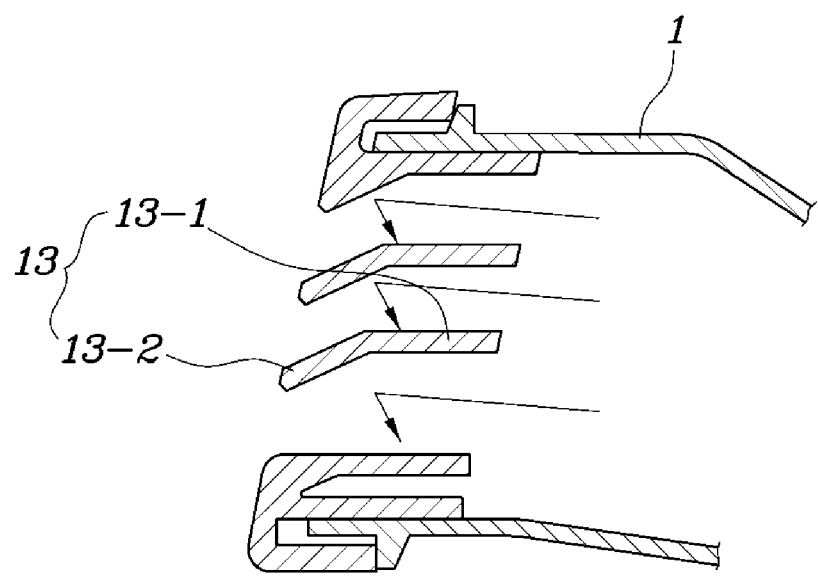
FIG. 7 is a cross-sectional view taken along line VII-VII of FIG. 6.

FIG. 7 is a cross-sectional view illustrating the grill 15 of FIG. 6. Each of the ribs 13 forming the grid of the grill 15 has a cross-sectional shape of a parallel part 13-1 parallel to a streamline of air flowing through the inlet part 5 and a sloping part 13-2 inclined to the parallel part 13-1 connected to each other.

That is, the rib 13 does not have a shape of a straight line simple in a cross-sectional structure, but rather a structure in which the parallel part 13-1 and the sloping part 13-2 are connected to each other as described above. As illustrated by bent arrows, the sloping part 13-2 functions to prevent noise generated inside the battery system 7 from traveling to the vehicle interior and to allow interior air to be efficiently introduced through the inlet hole.

Figure 8:
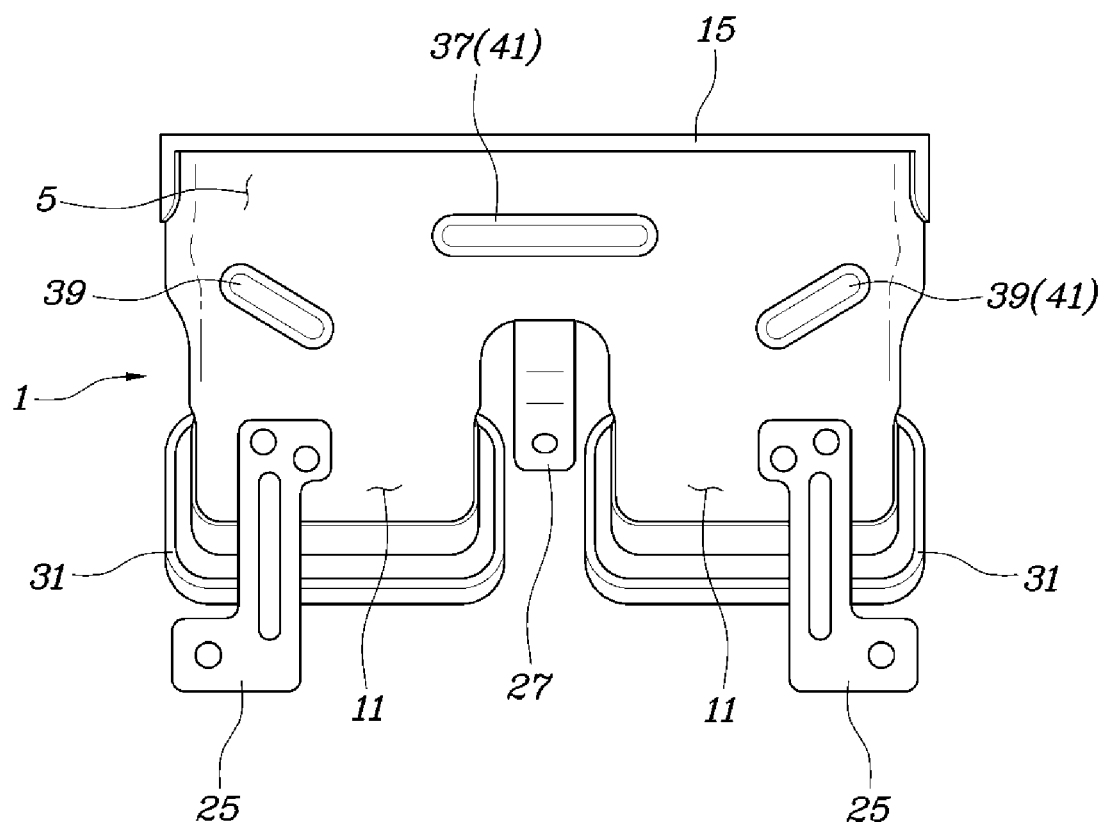
FIG. 8 is a view illustrating an inlet duct according to a second embodiment of the present disclosure.

Meanwhile, FIG. 8 is a view illustrating the inlet duct 1 according to a second embodiment of the present disclosure. A plurality of partition barriers are provided in the inlet duct 1, the partition barriers blocking a section of a portion of each flow path of air reaching the outlet hole 9 from the inlet hole 3. Thus, the inlet duct of FIG. 8 is different from the inlet duct 1 of FIG. 6.

Apart from the sloping part 13-2 of the rib 13 forming the grill 15, each of the partition barriers functions to block noise transferred from the inside of the battery system 7 so as not to be transferred to the vehicle interior.

In the embodiment of the present disclosure, the partition barriers include a middle partition barrier 37 provided at a position prior to being divided to the two outlet parts 11 from the inlet part 5, and a side partition barrier 39 provided at each of the outlet parts 11 of portions divided to the two outlet parts 11 from the inlet part 5.

Particularly, the side partition barrier 39 slants to a streamline of air flowing to the outlet part 11 from the inlet part 5, thereby securing the efficient flow of air and suppressing noise leakage.

That is, the two side partition barriers 39 of the opposite outlet parts 11 are configured to slant in directions of the two side partition barriers 39, gradually getting closer to each other along a flow of air flowing to the outlet parts 11 from the inlet part 5. Accordingly, air flowing toward the outlet part 11 from the inlet part 5 efficiently flows toward the outlet hole 9 under the soft guide of the side partition barrier 39.

In the inlet duct 1 of the present disclosure as described above, the partition barriers and the rib 13 of the grill 15 effectively prevents noise produced from the battery system 7 from travelling to the vehicle interior, thereby considerably improving the quietness of a vehicle.

Figure 9:
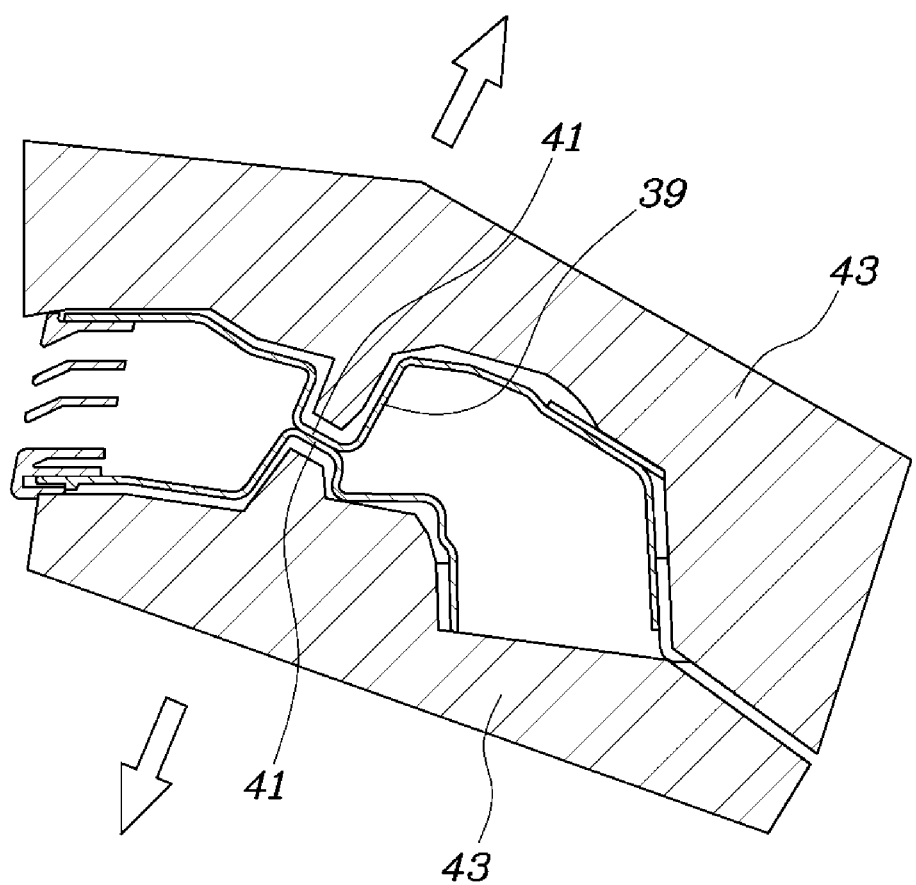
FIG. 9 is a view illustrating the process of forming the inlet duct of FIG. 8.

Meanwhile, as illustrated in FIG. 9, the partition barrier may comprise a recessed part 41 recessed inward from each of an upper side and a lower side of the inlet duct 1. The recessed part 41, which constitutes the partition barrier, is recessed along the same direction as each up and down demolding direction of a mold 43 when the inlet duct 1 is formed by a plastic blowing method. Accordingly, efficient productivity can be secured. Of course, the method of forming the partition barrier may not be limited thereto.

Although exemplary embodiments of the present disclosure have been described for illustrative purposes, those skilled in the art will appreciate that various modifications, additions and substitutions are possible, without departing from the scope and spirit of the disclosure as disclosed in the accompanying claims.

The invention claimed is:

1. An inlet duct for a vehicle battery system, the inlet duct comprising:
    an inlet part having an inlet hole configured to receive air from a vehicle interior;
    an outlet part having an outlet hole configured to supply air introduced to the inlet hole to the vehicle battery system; and
    a grill provided in the inlet part by having multiple ribs forming a grid to cover the inlet hole;
    wherein a plurality of partition barriers are provided in the inlet duct, each of the partition barriers blocking a portion of a flow path of air reaching the outlet hole from the inlet hole;
    wherein the partition barriers comprise a middle partition barrier and a side partition barrier disposed apart from a side of the middle partition barrier;
    wherein the outlet part and the inlet hole are arranged so that an opening direction of the outlet part is perpendicular to an opening direction of the inlet hole;
    wherein the battery system is located below a rear seat of a vehicle, and a front end of the battery system is spaced apart from a front end of the rear seat by a predetermined distance; and
    wherein the outlet part is divided from the inlet part, and has outlet holes configured to supply air introduced to the inlet hole to the battery system via two separated paths, and the middle partition barrier is provided at a position prior to being divided to the two outlet parts from the inlet part and the side partition barrier is provided at each of the outlet parts of portions divided to the two outlet parts from the inlet part.

2. The inlet duct of claim 1, wherein the inlet hole of the inlet part is configured to be open from a lower side of a middle of the rear seat toward a front thereof, and a lower side of each of the outlet parts is configured to communicate with an upper surface of the battery system.

3. The inlet duct of claim 1, wherein the two divided outlet parts are configured to be spaced apart from each other to avoid interference with a battery frame fixing the battery system to a vehicle body.

4. The inlet duct of claim 3, further comprising multiple fixing brackets configured to fix the inlet duct to the battery system.

5. The inlet duct of claim 4, wherein the fixing brackets comprise:
    an outlet part fixing bracket fixing an upper side of each of the two outlet parts of the inlet duct to the battery frame, and
    an inlet part fixing bracket fixing a lower side of the inlet part to the battery frame.

6. The inlet duct of claim 3, wherein a flange member having a lower surface parallel with an upper surface of the battery system is configured to be combined with an end part of each of the outlet parts such that the outlet part is brought into close contact with a duct hole, which is provided at an upper side of the battery system, from an upper side of the duct hole, and the outlet part and the duct hole are in a sealed state by surface contact therebetween.

7. The inlet duct of claim 3, further comprising
    a protrusion part at the duct hole provided at the upper side of the battery system by protruding upward therefrom such that the protrusion part is combined with each of the outlet parts by having sealing while communicating with the outlet part, and
    an expanded part at the outlet part, the expanded part being configured to seal an inner side of the protrusion part by surrounding an outer side of the protrusion part.

8. The inlet duct of claim 1, wherein an end part of a front of the grill is configured to slant along an extension line of a front section of a seat cushion of the rear seat.

9. The inlet duct of claim 1, wherein each of the ribs forming the grid of the grill has a cross-sectional shape of a parallel part parallel to a streamline of air flowing through the inlet part and a sloping part inclined to the parallel part connected to each other.

10. The inlet duct of claim 1, wherein the side partition barrier is configured to slant to a streamline of air flowing to the outlet part from the inlet part.

11. The inlet duct of claim 10, wherein the two side partition barriers of the opposite outlet parts are configured to slant in directions of the two side partition barriers getting closer to each other along a flow of air flowing to the outlet parts from the inlet part.

12. The inlet duct of claim 1, wherein the partition barriers are provided by a recessed part recessed inward from each of an upper side and a lower side of the inlet duct.

13. The inlet duct of claim 12, wherein the recessed part, which constitutes the partition barriers, is configured to be recessed along the same direction as each up and down demolding direction of a mold when the inlet duct is formed by a plastic blowing method.

14. The inlet duct of claim 1, wherein a widthwise direction length of the inlet hole of the inlet duct is configured to be longer than a lengthwise length of the inlet duct.

15. An inlet duct for a vehicle battery system, the inlet duct comprising:
- an inlet part having an inlet hole configured to receive air from a vehicle interior;
- an outlet part having an outlet hole configured to supply air introduced to the inlet hole to the battery system; and
- a grill provided in the inlet part by having multiple ribs forming a grid to cover the inlet hole;
- wherein a plurality of partition barriers are provided in the inlet duct, each of the partition barriers blocking a portion of flow path of air reaching the outlet hole from the inlet hole;
- wherein the partition barriers comprise a middle partition barrier and a side partition barrier disposed apart from a side of the middle partition barrier;
- wherein the side partition barrier is configured to slant to a streamline of air flowing to the outlet part from the inlet part;
- wherein the outlet part and the inlet hole are arranged so that an opening direction of the outlet part is perpendicular to an opening direction of the inlet hole;
- wherein the battery system is located below a rear seat of a vehicle, and a front end of the battery system is spaced apart from a front end of the rear seat by a predetermined distance; and
- wherein the outlet part is divided from the inlet part, and has outlet holes configured to supply air introduced to the inlet hole to the battery system via two separated paths, and the middle partition barrier is provided at a position prior to being divided to the two outlet parts from the inlet part and the side partition barrier is provided at each of the outlet parts of portions divided to the two outlet parts from the inlet part.

16. An inlet duct for a vehicle battery system, the inlet duct comprising:
- an inlet part having an inlet hole configured to receive air from a vehicle interior;
- an outlet part having an outlet hole configured to supply air introduced to the inlet hole to the battery system; and
- a grill provided in the inlet part by having multiple ribs forming a grid to cover the inlet hole;
- wherein a plurality of partition barriers are provided in the inlet duct, each of the partition barriers blocking a portion of flow path of air reaching the outlet hole from the inlet hole;
- wherein the partition barriers comprise a middle partition barrier and a side partition barrier disposed apart from a side of the middle partition barrier;
- wherein the middle partition barrier and the side partition barrier are arranged so as not to overlap each other in forward and backward direction and left and right direction;
- wherein the outlet part and the inlet hole are arranged so that an opening direction of the outlet part is perpendicular to an opening direction of the inlet hole;
- wherein the battery system is located below a rear seat of a vehicle, and a front end of the battery system is spaced apart from a front end of the rear seat by a predetermined distance; and
- wherein the outlet part is divided from the inlet part, and has outlet holes configured to supply air introduced to the inlet hole to the battery system via two separated paths, and the middle partition barrier is provided at a position prior to being divided to the two outlet parts from the inlet part and the side partition barrier is provided at each of the outlet parts of portions divided to the two outlet parts from the inlet part.

* * * * *